Patented Aug. 3, 1943

2,325,984

UNITED STATES PATENT OFFICE 2,325,984

OIL-RESISTANT SYNTHETIC RUBBER CEMENT AND METHOD OF PREPARING SAME

Donald V. Sarbach, Cuyahoga Falls, Ohio, assignor to The B. F. Goodrich Company, New York, N. Y., a corporation of New York No Drawing. Application December 30, 1941, Serial No. 424,962

8 Claims. (Cl. 260—84.5)

This invention relates to the method of improving the properties of butadiene rubbers, and particularly to a method of treating butadiene rubbers which improves their properties as raw materials for the manufacture of cements.

It is well known that synthetic rubber-like materials may be prepared by the polymerization of butadienes, by which is meant butadiene-1,3 and its homologues and analogues such as isoprene, piperylene, 2,3-dimethyl-butadiene, and chloroprene which polymerize in essentially the same manner, either alone or in admixture with each other and/or in the presence of one or more organic monomers copolymerizable therewith such as acrylonitrile, methacrylonitrile, methyl acrylate, methyl methacrylate, styrene, methyl isopropenyl ketone, vinylidene chloride isobutene, etc. Certain of these butadiene rubbers such as copolymers of butadiene and acrylonitrile, particularly copolymers prepared from mixtures containing from 25 to 100% as much acrylonitrile as butadiene, and the plastic polymerized chloroprene known as neoprene, are of great commercial importance because of their resistance to solvents which rapidly deteriorate natural rubber. It is difficult to prepare cements with a high rubber content from these solvent-resistant synthetic rubbers, and only a limited number of solvents will dissolve them at all. Furthermore, cements prepared from these oil-resisting rubbers have a pronounced tendency to gel either when they are left in an undisturbed condition for a few hours or days or when they are subjected to violent agitation.

It is the principal object of this invention to provide a method for treating butadiene rubbers which will increase their desirability as raw materials for the preparation of cements. It is a further object of the invention to provide a method whereby the cement-making properties of any butadiene rubber may be improved, although the method will be most useful in connection with the oil-resisting butadiene rubbers in which the difficulties encountered in making cements are the most serious.

I have discovered that the cement-making properties of unvulcanized butadiene rubbers may be improved by acidifying the rubbers in a solid state. The invention may be practiced in a variety of modifications as hereinafter disclosed, but the essential feature of the invention is to lower the pH of the material contained in or surrounding the butadiene rubber by any desired process and by the use of any desired acid. One of the preferred embodiments of this invention comprises adding an acid or a material which acts as an acid to a butadiene rubber while it is being worked on a roll mill or in an internal mixer. Enough of the acid is added to appreciably lower the pH of the material contained in or surrounding the butadiene rubber. It is accordingly desirable to employ small amounts of mineral acids such as sulfuric or hydrochloric acids or organic acids having a pronounced effect such as benzoic acid, acetic acid, or trichloroacetic acid rather than materials such as stearic acid or lauric acid whose effect upon the acidity of the butadiene rubber when employed in small quantities as barely measurable.

Example I

An oil-resisting synthetic rubber was prepared by the emulsion polymerization of a mixture of 55 parts by weight of butadiene and 45 parts of acrylonitrile in an alkaline soap solution. The copolymer was precipitated in the form of crumbs from 2-4 mm. in diameter by the addition of alum, to emulsion, and the insoluble soap was removed from the crumbs by washing with a solution of sodium hydroxide. A test showed that a 10% solution of this butadiene rubber in chlorobenzene was quite viscous and started to gel after 17 hours. A batch of the rubber was placed upon a roll mill, and 10% of a 10% aqueous solution of acetic acid was added thereto. A 10% solution of this acidified butadiene rubber in chlorobenzene was much less viscous than the untreated material and had not started to gel in six days. A similar effect may be obtained by treating other oil-resisting butadiene rubbers such as polymerized chloroprene (generally called neoprene) with other acids such as 0.2% of trichloracetic acid of benzoic acid or a dilute (from 0.1 to 5%) solution of sulfuric of hydrochloric acid. The treatment of other butadiene rubbers such as copolymers of butadiene and styrene results in increased solubility of the rubber and decreased viscosity of the cement, although the beneficial effects are in general not as noticeable since no difficulty is ordinarily encountered in preparing cements from butadiene rubbers which are not resistant to oils.

Example II

A mixture of 55 parts by weight of butadiene and 45 parts of acrylonitrile was polymerized in emulsion, coagulated, and washed as in Example I. One same of the rubber was washed with water, extracted with alkali, again washed with water, dried, and dissolved in chlorobenzene to form a cement which started to gel in a few days. Another sample of the alkali-extracted material which was washed with water acidified with sulfuric acid to a pH between 4 and 5 prior to drying resisted gelling over twice as long as the sample of rubber which had not been acidified. The washing can be effected by merely placing the crumbs of rubber in a vat in acidified water and stirring to keep the crumbs in suspension, or by pouring acidified water over the crumbs in a filter box, or by adding acid with the wash water on a wash mill.

While improvements in the cement-making properties of butadiene rubbers are generally obtained when the rubber is acidified, the most noticeable effects are observed when the pH is changed from above 7 to below 7, preferably to 6 or less. The acidity of alkalinity of the rubber may be roughly measured by dissolving the rubber in a solvent, extracting the cement with an equal volume of distilled water, and measuring the pH of the water. When the water extract of butadiene rubbers tested in this manner has a pH above 7, cements prepared from the rubber have a pronounced tendency to gel which increases with an increase in pH. Acidification of the rubber improves the cement-making properties of the rubber, and ordinarily produces a rubber which can be made into cements of satisfactory stability. The use of too great a quantity of acid will, of course, be undesirable due to the corrosive nature of the cement. It will ordinarily be found, however, that an appreciable improvement in the cement making properties of the butadiene rubbers can be effected by the method of this invention without adversely affecting any of the other desirable properties of the rubber.

The acidification of the butadiene rubbers should be performed while the rubber is in a solid form. The addition of an acid to a liquid solution or dispersion of a butadiene rubber does not produce the beneficial effects obtainable by acidifying the solid rubber while at is being washed on a mill or while it is in the form of crumbs.

Although I have herein disclosed specific embodiments of my invention, I do not intend to limit the invention solely thereto for many variations and modifications are within the spirit and scope of the invention as defined in the appended claims.

I claim:

1. The method of preparing a synthetic rubber cement from an oil-resisting synthetic rubber selected from the class consisting of polymers of chloroprene and copolymers of butadiene-1,3 and acrylonitrile prepared by polymerizing mixtures of butadiene-1,3 and acrylonitrile containing from 25 to 100% as much acrylonitrile as butadiene-1,3 which comprises incorporating with said synthetic rubber in a solid form a sufficient amount of an acid to impart to an aqueous extract of a solution of said synthetic rubber a pH lower than 7, and then dissolving said synthetic rubber containing the incorporated acid in a solvent.

2. The method of preparing a synthetic rubber cement from an oil-resisting synthetic rubber selected from the class consisting of polymers of chloroprene and copolymers of butadiene-1,3 and acrylonitrile prepared by polymerizing mixtures of butadiene-1,3 and acrylonitrile containing from 25 to 100% as much acrylonitrile as butadiene-1,3, which comprises treating said synthetic rubber in a solid form with a dilute aqueous solution of an acid having a pH of about 4 to 6 in such a manner as to incorporate a small amount of the acid in said synthetic rubber, and then dissolving said synthetic rubber containing the incorporated acid in a solvent.

3. The method of preparing a synthetic rubber cement from a copolymer prepared by polymerizing a mixture of butadiene-1,3 and acrylonitrile containing from 25 to 100% as much acrylonitrile as butadiene-1,3, which comprises incorporating with said copolymer in a solid form a sufficient amount of an acid to impart to an aqueous extract of a solution of said copolymer a pH at least as low as 6, and then dissolving said copolymer containing the incorporated acid in a solvent.

4. The method of preparing a cement from a solid rubbery copolymer prepared by polymerizing in aqueous emulsion a mixture of butadiene-1,3 and acrylonitrile containing from 25 to 100% as much acrylonitrile as butadiene-1,3 and then separating the solid rubbery copolymer from the emulsion, which comprises treating said solid rubbery copolymer with a dilute solution of a mineral acid in such a manner as to incorporate a small amount of said acid in said copolymer, and then dissolving said copolymer containing the incorporated acid in a solvent.

5. The method of preparing a cement from a solid rubbery copolymer prepared by polymerizing in aqueous emulsion about 55 parts by weight of butadiene-1,3, and about 45 parts by weight of acrylonitrile and then separating the solid rubbery copolymer from the emulsion, which comprises mixing with said solid rubbery copolymer a small amount of an aqueous solution of an acid having a pH at least as low as 6, and then dissolving the acidified copolymer in a solvent.

6. A synthetic rubber cement comprising an oil-resisting synthetic rubber selected from the class consisting of polymers of chloroprene and copolymers of butadiene-1,3 and acrylonitrile prepared by polymerizing mixtures of butadiene-1,3 and acrylonitrile containing from 25 to 100% as much acrylonitrile as butadiene, dissolved in a solvent, the said synthetic rubber having incorporated therein prior to dissolving in the solvent a sufficient amount of an acid to impart to an aqueous extract of the cement a pH lower than 7.

7. A synthetic rubber cement comprising a copolymer prepared by polymerizing a mixture of butadiene-1,3 and acrylonitrile containing from 25 to 100% as much acrylonitrile as butadiene, dissolved in a solvent, the said copolymer having incorporated therein prior to dissolving in the solvent a sufficient amount of an acid to impart to an aqueous extract of the cement a pH at least as low as 6.

8. A synthetic rubber cement comprising a copolymer prepared by the polymerization in aqueous emulsion of about 55 parts by weight of butadiene-1,3 and about 45 parts by weight of acrylonitrile, dissolved in a solvent, the said copolymer having incorporated therein prior to dissolving in the solvent a small amount of an aqueous acid solution having a pH at least as low as 6.

DONALD V. SARBACH.